(12) United States Patent
Dietz et al.

(10) Patent No.: US 10,383,475 B2
(45) Date of Patent: Aug. 20, 2019

(54) THERMALLY-ACTUATED FLOW-RESTRICTOR DEVICE FOR AIRCRAFT BEVERAGE MAKER

(71) Applicant: B/E Aerospace, Inc., Wellington, FL (US)

(72) Inventors: Stuart A. Dietz, Topeka, KS (US); Craig Crosswait, Belton, MO (US); Dan Aeschliman, Belton, MO (US); Luke E. Kelly, Basehor, KS (US)

(73) Assignee: B/E Aerospace, Inc., Winston Salem, NC (US)

(*) Notice: Subject to any disclaimer, the term of this patent is extended or adjusted under 35 U.S.C. 154(b) by 255 days.

(21) Appl. No.: 15/250,512

(22) Filed: Aug. 29, 2016

(65) Prior Publication Data

US 2017/0055765 A1 Mar. 2, 2017

Related U.S. Application Data

(60) Provisional application No. 62/213,020, filed on Sep. 1, 2015.

(51) Int. Cl.
*B64D 11/04* (2006.01)
*F16K 31/00* (2006.01)
(Continued)

(52) U.S. Cl.
CPC ............... *A47J 31/46* (2013.01); *A47J 31/58* (2013.01); *B64D 11/04* (2013.01); *F16K 31/002* (2013.01)

(58) Field of Classification Search
CPC .......... A47J 31/58; A47J 31/46; A47J 31/106; F16K 31/003; F16K 31/56; F16K 15/144;
(Continued)

(56) References Cited

U.S. PATENT DOCUMENTS 4,295,602 A * 10/1981 Priesmeyer ............ G05D 23/10
  236/48 R
4,646,965 A *  3/1987 Anderson ................. F16T 1/08
  236/101 E
(Continued)

FOREIGN PATENT DOCUMENTS

CN  104373671 A   2/2015
DE    8714098 U1  12/1987
(Continued)

OTHER PUBLICATIONS

DE-3824444-A1 English Translation.*
(Continued)

*Primary Examiner* — Christopher R Zerphey
*Assistant Examiner* — Schyler S Sanks
(74) *Attorney, Agent, or Firm* — Donna P. Suchy

(57) ABSTRACT

A thermally-actuated flow-restrictor device in an aircraft galley insert is provided that includes a housing formed of first and second flanged fittings. The first fitting includes an outlet port for connection to an aircraft galley insert, and the second fitting includes an inlet port for connection to an aircraft potable water supply. The second fitting also includes a boss surrounding the inlet port. A closure element contained within the housing includes a plurality of metals having different coefficients of thermal expansion. This allows the element to actuate depending upon the temperature of water contacting the closure element. When water having a predetermined temperature contacts the closure element, its surface facing the inlet port becomes convexly positioned proximal to the boss, thereby restricting the backflow of water through the flow-restrictor device. Once the closure element cools, its surface facing the inlet port becomes concave, resulting in normal device operation.

18 Claims, 4 Drawing Sheets

(51) Int. Cl.
*A47J 31/46* (2006.01)
*A47J 31/58* (2006.01)

(58) Field of Classification Search
CPC . F16K 31/002; F16K 99/0038; B67D 1/1279; B67D 1/1455; B64D 11/04; B64D 11/0007
See application file for complete search history.

(56) References Cited

U.S. PATENT DOCUMENTS

| | | | | |
|---|---|---|---|---|
| 4,830,277 | A | * | 5/1989 | Hood ............... G05D 23/10 236/48 R |
| 6,007,711 | A | * | 12/1999 | Atwood .............. B01D 27/06 123/514 |
| 6,450,412 | B1 | * | 9/2002 | Cessac .............. G05D 23/10 236/48 R |
| 2002/0145052 | A1 | | 10/2002 | Cessac |

FOREIGN PATENT DOCUMENTS

| | | | | |
|---|---|---|---|---|
| DE | 3824444 | A1 | * | 1/1990 ........... F16K 31/002 |
| DE | 3824444 | A1 | | 1/1990 |
| DE | 19949365 | A1 | | 5/2000 |

OTHER PUBLICATIONS

International Search Report for International Application No. PCT/US2016/049498 (11 pgs.) dated Nov. 17, 2016.
Office Action dated Dec. 5, 2018 for CN Patent Application No. 201680047509.9.

* cited by examiner

THERMALLY-ACTUATED FLOW-RESTRICTOR DEVICE FOR AIRCRAFT BEVERAGE MAKER

CROSS-REFERENCES TO RELATED APPLICATIONS

This application claims priority from U.S. Provisional Application No. 62/213,020, filed Sep. 1, 2015, which is incorporated by reference in its entirety.

BACKGROUND

The present invention generally relates to a flow control valve, and more particularly relates to a thermally-actuated flow-restrictor device for an aircraft galley insert.

Aircraft galley inserts or appliances that contain tanks of hot water, such as coffee or tea beverage makers, are generally installed in an aircraft galley using an open plumbing system. In this type of system, water from a potable water supply in the aircraft fills the tank of the galley insert when the water is pressurized and drains from the tank when the pressure is relieved. This type of system is intended to prevent formation of excessively high pressure inside the tank when the water in the tank is heated by the aircraft galley insert, such as when dispensing hot drinks.

However, in an open plumbing system, the tank of the galley insert may experience a drop in pressure after the water in the tank is heated. In the case of beverage makers, where water in the tank is usually heated to 180 degrees Fahrenheit or higher, any drop in pressure in the tank may result in a possible backflow of hot water into the aircraft galley's plumbing system. Consequently, crew members in the galley may be at risk of harm if they use a galley sink connected to the aircraft galley's plumbing system, since extremely hot water may unexpectedly expel from the sink faucet as a result of the backflow from the beverage maker.

Conventional backflow prevention mechanisms or flow-restrictor devices provide inadequate solutions to this problem. For example, check valves are designed to prevent complete backflow of water, and therefore do not typically provide a sufficient outlet for relief of pressure of hot, highly pressurized water. Without a sufficient outlet for the pressure, a crew member would be at risk when he or she uses the beverage maker, since the hot, highly pressurized water would be expelled from the beverage maker at an unexpectedly high rate of speed. Additionally, other types of valves, such as thermal valves or electrically operated valves, are typically large and heavy and thus generally must be installed directly in the aircraft galley's plumbing system, which can be very costly to set up and maintain.

Hence, there is a need for a flow-restrictor device for an aircraft galley insert that prevents excessive backflow of hot water from the galley insert into the aircraft galley's plumbing system, while also preventing the galley insert from becoming highly pressurized. There is also a need for a flow-restrictor device that is lightweight, compact, and capable of fitting within a standard aircraft galley insert without requiring external installation directly in the aircraft galley's plumbing system, and that does not require electricity for operation. The present invention meets this and other needs.

SUMMARY OF THE INVENTION

The present invention provides a thermally-actuated flow-restrictor device for an aircraft galley insert that is sufficiently compact and lightweight to fit into the aircraft galley insert. The present invention restricts excessive backflow of hot water from an aircraft galley insert into the aircraft galley's plumbing system while providing an outlet for relief of highly pressurized water inside the aircraft galley insert. In this way, the present invention cost-effectively prevents the unanticipated expulsion of hot water from galley sink faucets connected to the aircraft galley's plumbing system and from the galley insert itself, thereby allowing for crew member safety without the need to externally install and maintain a large and heavy valve in the aircraft galley's plumbing system. Moreover, the present invention is actuated by warm temperatures, so no electricity is required for operation of the thermally-actuated flow-restrictor device.

Accordingly, a thermally-actuated flow-restrictor device is provided for use in an aircraft galley insert such as a beverage maker. The thermally-actuated flow-restrictor device includes a housing formed by a first flanged fitting and a second flanged fitting. The second flanged fitting is detachably connected to the first flanged fitting by a fastening arrangement. The first flanged fitting includes an outlet port configured to connect in fluid communication with the aircraft galley insert, and the second flanged fitting includes an inlet port configured to connect in fluid communication with a potable water supply in the aircraft. A seal, such as an O-ring, may be contained within the housing for preventing leakage of water flowing through the thermally-actuated flow-restrictor device from the potable water supply.

A closure element such as a bimetal disc is contained within the housing that includes one or more ports or apertures for water to flow within the housing from the inlet port to the outlet port. The closure element includes a plurality of metals having different coefficients of thermal expansion which allow the closure element to actuate in response to the temperature of water contacting the closure element. More particularly, the closure element has a surface facing the inlet port that is changeable as a result of the different coefficients of thermal expansion between a concave surface and convex surface depending upon the temperature of water contacting the closure element.

The surface of the closure element is concave by default when the closure element is at ambient temperature, thereby allowing water to flow through the closure element from the inlet port to the outlet port. When water having a predetermined temperature, for example at least 120 degrees Fahrenheit, contacts the closure element, the surface of the closure element facing the inlet port becomes convex and proximal to a boss concentrically surrounding the inlet port, thereby restricting the backflow of water through the closure element from the outlet port to the inlet port. When the closure element cools back toward ambient temperature, the surface of the closure element facing the inlet port returns to being concave, thereby allowing the water to flow unrestricted again through the closure element from the inlet port to the outlet port.

The thermally-actuated flow-restrictor device is sufficiently lightweight and compact that it can be installed in the water inlet line of the aircraft galley insert between its water inlet fitting and water tank. Alternatively, the flow-restrictor device can be directly installed in the aircraft galley insert's water inlet fitting or water tank itself.

These and other features and advantages of the present invention will become apparent from the following detailed description of the preferred embodiment which, taken in conjunction with the accompanying drawings, illustrate by way of example the principles of the invention.

DETAILED DESCRIPTION OF THE PREFERRED EMBODIMENTS

A preferred embodiment of the present invention provides a thermally-actuated flow-restrictor device that is lightweight and compact enough to be contained in aircraft galley inserts including beverage maker appliances. The preferred embodiment of the present invention restricts the backflow of hot water from the galley inserts into the aircraft galley's plumbing system while also allowing for the galley inserts to have a sufficient outlet for relief of pressure, thereby increasing the safety of crew members in the galley.

Figure 1:
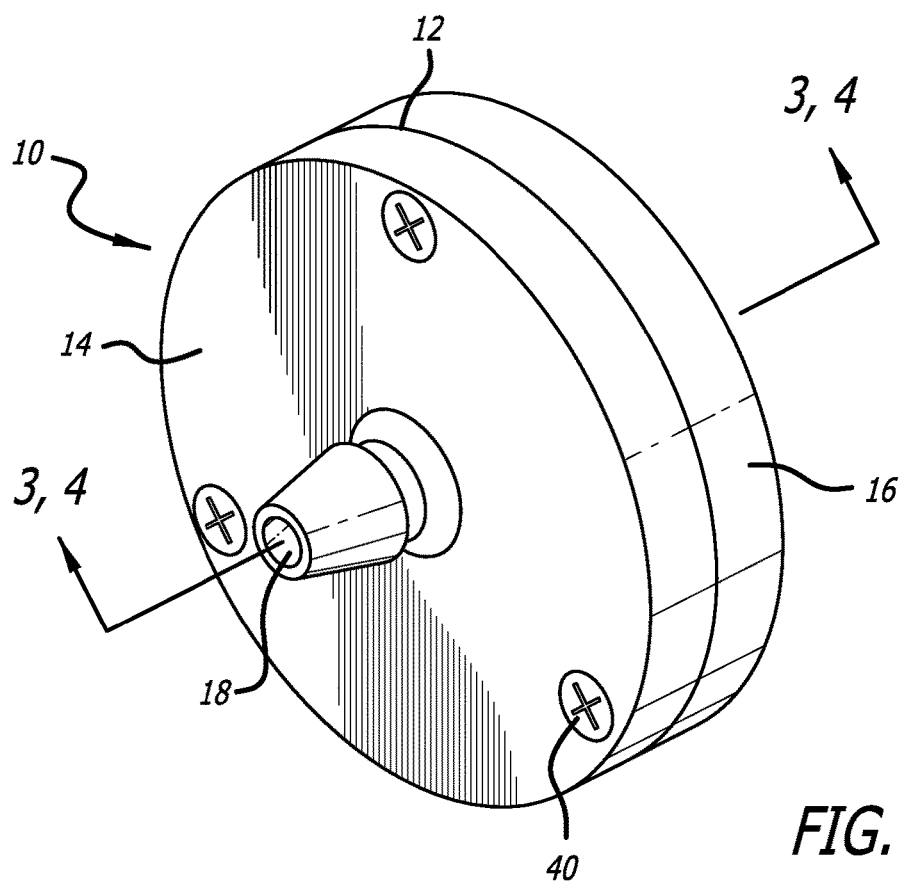
FIG. 1 is a perspective view of a thermally-actuated flow-restrictor device according to a preferred embodiment of the present invention for use in an aircraft galley insert.
Figure 2:
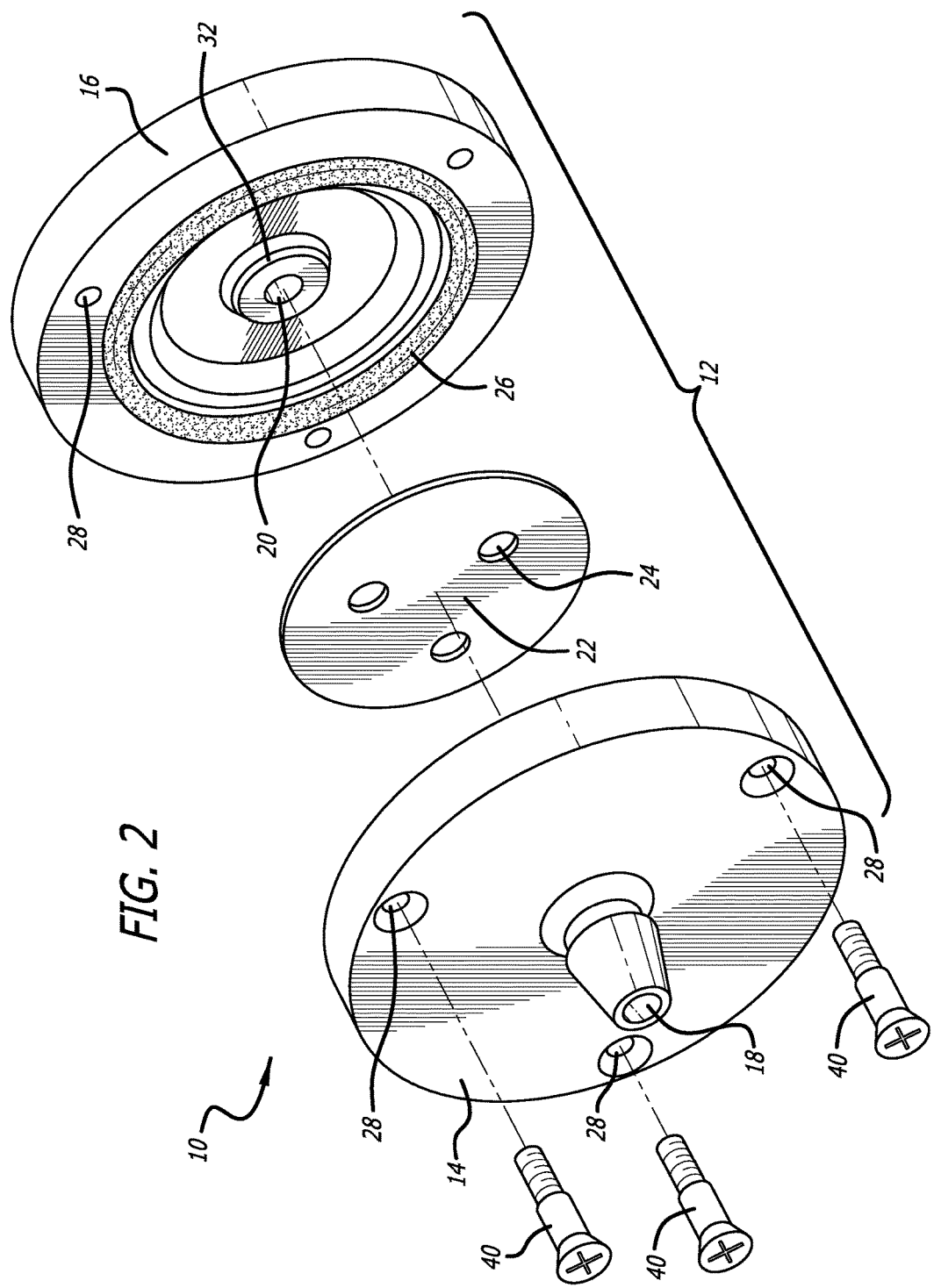
FIG. 2 is an exploded view of the thermally-actuated flow-restrictor device of FIG. 1 illustrating a closure element used to restrict the flow of water through the thermally-actuated flow-restrictor device.

Referring to FIGS. 1 and 2, according to a preferred embodiment of the present invention, a thermally-actuated flow-restrictor device 10 is provided that includes a housing 12 formed of a first flanged fitting 14 and a second flanged fitting 16. The first flanged fitting includes an outlet port 18 that is configured to be connected in fluid communication with an aircraft galley insert (not shown), for example, a beverage maker appliance, and the second flanged fitting includes an inlet port 20 that is configured to be connected in fluid communication with the aircraft's potable water supply. A closure element 22 is contained within the housing that includes one or more ports or apertures 24 through which water within the housing can flow. Moreover, to prevent water flowing through the flow-restrictor device from leaking outside the housing, the housing may also contain a seal 26 such as an O-ring. The first flanged fitting and the second flanged fitting are fastened together to form the housing via a fastener arrangement 28 using one or more bolts, screws or other conventional fasteners 40. As a result, the flow-restrictor device 10 enables the flow of potable water from the aircraft's potable water supply through inlet port 20 into the aircraft galley insert via outlet port 18.

Figure 3:
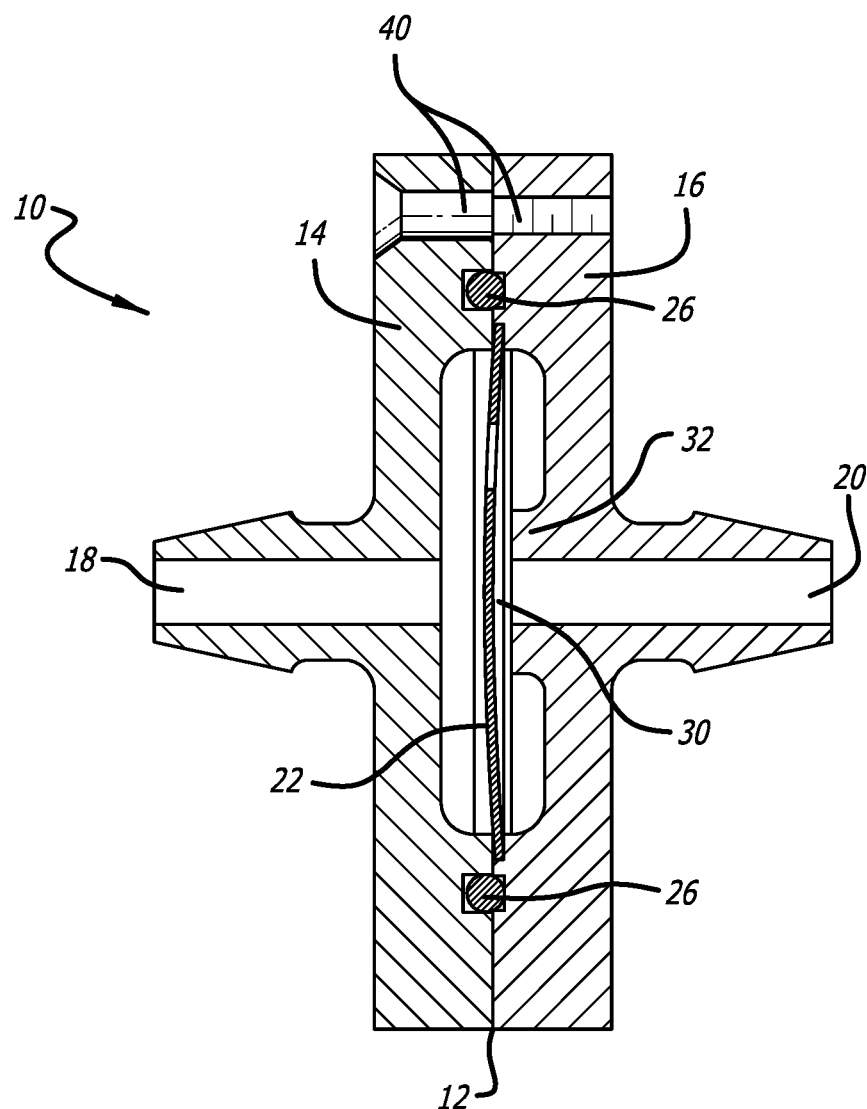
FIG. 3 is a cross-sectional view of the thermally-actuated flow-restrictor device of FIG. 1 in which the surface of the closure element facing the inlet port is concave to allow the flow of water from the inlet port through the thermally-actuated flow-restrictor device.
Figure 4:
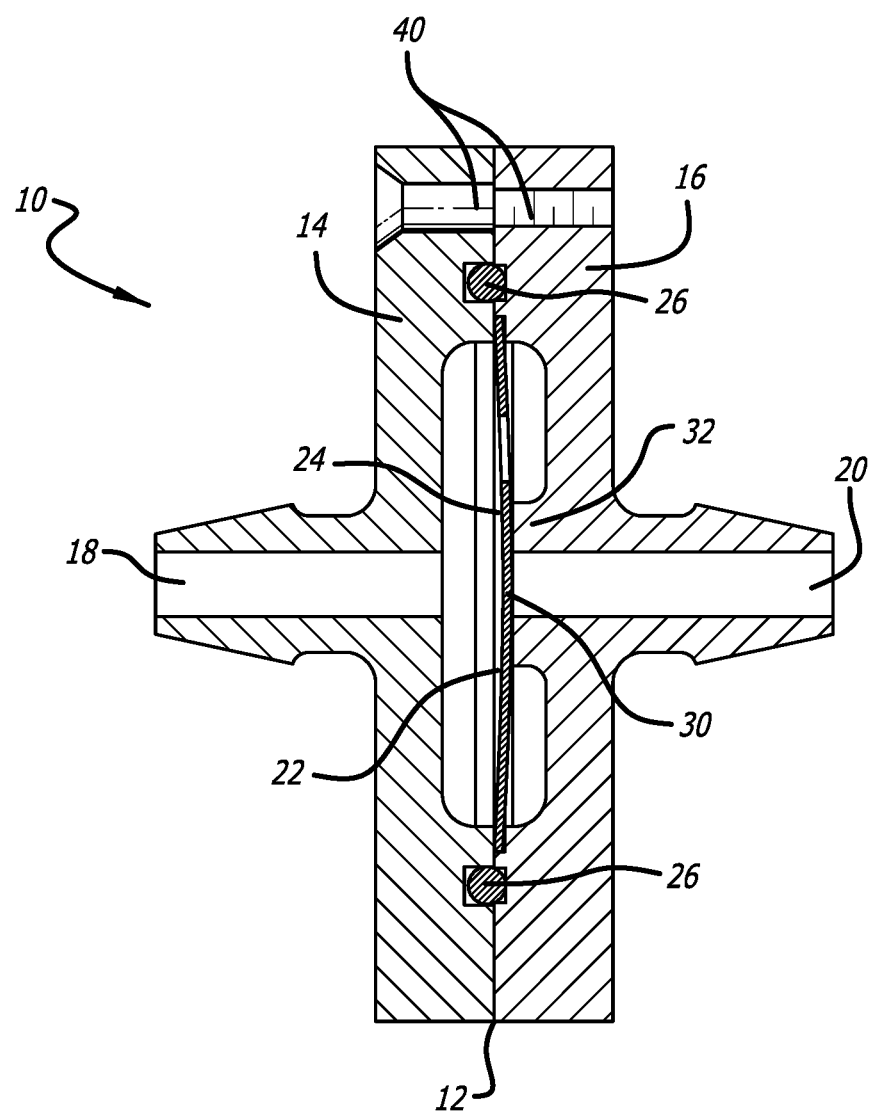
FIG. 4 is a cross-sectional view of the thermally-actuated flow-restrictor device of FIG. 1 in which the surface of the closure element facing the inlet port is convex and proximal to a boss concentrically surrounding the inlet port to restrict the backflow of water from the outlet port through the thermally-actuated flow-restrictor device.

Referring now to FIGS. 3 and 4, to restrict the backflow of hot water from the outlet port 18 to the inlet port 20, the closure element 22 is designed in a preferred embodiment of the present invention to be bimetal, or to contain a plurality of metals in general, with each metal having a different coefficient of thermal expansion. The different coefficients of thermal expansion allow the closure element to actuate in response to changes to its temperature caused by contact with hot water backflowing from the aircraft galley insert. The closure element is pre-calibrated to actuate when hot water, for example, water having a temperature of at least 120 degrees Fahrenheit, contacts the closure element.

In particular, the closure element 22 includes a surface 30 facing the inlet port that alternates between being concave (as shown in FIG. 3) or convex (as shown in FIG. 4) depending on the temperature of water contacting the closure element. In the preferred embodiment of the present invention, the surface is constructed to be concave when the closure element is at ambient temperature or in contact with ambient water supplied by the aircraft's potable water supply, as illustrated in FIG. 3. Thus, the closure element by default allows water to flow unrestricted through the housing 12 via the apertures 24 of the closure element from the inlet port 20 to the outlet port 18.

If hot water backflows from the aircraft galley insert through the outlet port 18 into the housing 12 and contacts the closure element 22, the closure element will be exposed to the higher pre-calibrated temperature, and the surface 30 of the closure element will change or snap into being convex. As illustrated in FIG. 4, this change will cause the closure element to become proximal to a boss 32 protruding from the second flanged fitting 16 that concentrically surrounds the inlet port 20, thus restricting fluid access to the inlet port.

Although the surface 30 of the closure element 22 restricts fluid access to the inlet port 20 while convex, it does not completely prevent access. For example, a small gap may exist between the convex surface 30 and the boss 32 for water to flow. Alternatively, the convex surface may contact the boss while leaving at least a portion of one aperture 24 aligned with the inlet port for water to flow. Therefore, pressure from hot water in the aircraft galley insert can still be alleviated even though backflow is restricted.

As a result, the closure element 22 limits the rate of hot water flowing back into the aircraft galley's plumbing system from the aircraft galley insert through the flow-restrictor device 10 while also providing relief of pressure in the aircraft galley insert. After the backflow has ceased and the closure element cools back towards ambient temperature, the surface 30 of the closure element will change or snap back into being concave as shown in FIG. 3, thus allowing potable water to again flow unrestricted through the flow-restrictor device.

The thermally-actuated flow-restrictor device 10 can thus be used in a method of restricting the backflow of water from aircraft galley inserts. To operate the device, the closure element 22 is positioned between the first flanged fitting 14 and second flanged fitting 16 such that the concave surface 30 of the closure element faces the inlet port 20 as shown in FIG. 3. A seal 26 such as an O-ring can be also positioned between the first flanged fitting and second flanged fitting. The first flanged fitting and second flanged fitting are afterwards attached together to form the housing 12, and the housing is installed in the water inlet line of the aircraft galley insert by connecting the outlet port 18 of the housing in fluid communication with the aircraft galley insert, and by connecting the inlet port of the housing in fluid communication with the aircraft's potable water supply. Water can thereafter flow through the thermally-actuated flow-restrictor device from the aircraft's potable water supply to the aircraft galley insert. When water of a predetermined temperature (i.e. hot water) back flowing from the aircraft galley insert through the outlet port contacts the closure element, the closure element will actuate such that its surface facing the inlet port becomes convex and proximal to the boss 32 as shown in FIG. 4, and the backflow through the thermally-actuated flow-restrictor device will thereafter be restricted. Once the closure element cools back toward ambient temperature, the closure element will actuate to its original position as shown in FIG. 3, and normal operation of the thermally-actuated flow-restrictor device will resume.

As a result, the preferred embodiment of the present invention advantageously restricts the backflow of hot water from the water tank in the aircraft galley insert into the aircraft's plumbing system while also preventing the tank from becoming too highly pressurized so that safety of crew members is maintained. The flow-restrictor device is sufficiently lightweight and compact enough to be installed in the water inlet line of the aircraft galley insert or appliance between the appliance's water inlet fitting and water tank, or alternatively in the water inlet fitting or water tank itself. The preferred embodiment of the present invention also does not require electrical operation due to its thermally-actuated nature, thus greatly simplifying and reducing the cost of designing, installing and maintaining the thermally-actuated flow-restrictor device.

It will be apparent from the foregoing that while particular forms of the invention have been illustrated and described, various modifications can be made without departing from the spirit and scope of the invention. For example, although the closure element is expressly illustrated in the Figures as a disc, it should be noted that other shapes for the closure element may be used. Accordingly, it is not intended that the invention be limited, except as by the appended claims.

What is claimed is:

1. A thermally-actuated flow-restrictor device for an aircraft galley insert, the flow- restrictor device comprising:
   a housing including a first flanged fitting and a second flanged fitting, the first flanged fitting including an outlet port configured to connect in fluid communication with the aircraft galley insert, and the second flanged fitting including an inlet port configured to connect in fluid communication with an aircraft potable water supply;
   a closure element contained within the housing, the closure element including one or more apertures for water to flow within the housing from the inlet port to the outlet port, the closure element having a surface facing the inlet port that is concave when the closure element is at ambient temperature to allow water to flow through the closure element from the inlet port to the outlet port;
   wherein the closure element includes a plurality of metals each having a different coefficient of thermal expansion which allow the surface of the closure element facing the inlet port to become convex when water having a predetermined temperature contacts the closure element and that allow the surface of the closure element to return to being concave when the closure element cools toward ambient temperature; and
   wherein when the surface of the closure element is convex, the surface is proximal to a boss concentrically surrounding the inlet port with a gap between the surface and the boss such that the boss does not contact the surface, thereby restricting the backflow of water in the housing from the outlet port to the inlet port while maintaining some access for water to flow to or from the inlet port.

2. The thermally-actuated flow-restrictor device of claim 1, wherein the closure element is bimetal.

3. The thermally-actuated flow-restrictor device of claim 2, wherein the closure element is a disc.

4. The thermally-actuated flow-restrictor device of claim 1, further comprising a seal located within the housing.

5. The thermally-actuated flow-restrictor device of claim 4, wherein the seal is an O-ring.

6. The thermally-actuated flow-restrictor device of claim 1, wherein the predetermined temperature is at least 120 degrees Fahrenheit.

7. The thermally-actuated flow-restrictor device of claim 1, wherein the flow- restrictor device is configured to be installed in a water inlet line of the aircraft galley insert between a water inlet fitting and a water tank of the aircraft galley insert.

8. The thermally-actuated flow-restrictor device of claim 1, wherein the flow- restrictor device is configured to be installed in one of a water inlet fitting and a water tank of the aircraft galley insert.

9. The thermally-actuated flow-restrictor device of claim 1, further comprising a fastener arrangement in the housing for fastening the first flanged fitting to the second flanged fitting.

10. A thermally-actuated flow-restrictor device for an aircraft galley insert, the flow- restrictor device comprising:
    a housing including a first flanged fitting and a second flanged fitting, the first flanged fitting including an outlet port configured to connect in fluid communication with the aircraft galley insert, and the second flanged fitting including an inlet port configured to connect in fluid communication with an aircraft potable water supply;
    a closure element contained within the housing, the closure element including one or more apertures for water to flow within the housing from the inlet port to the outlet port, the closure element having a surface facing the inlet port that is concave when the closure element is at ambient temperature to allow water to flow through the closure element from the inlet port to the outlet port;
    wherein the closure element is a disc that includes a plurality of metals each having a different coefficient of thermal expansion which allow the surface of the closure element facing the inlet port to become convex when water having a predetermined temperature contacts the closure element and which allows the surface of the closure element to return to being concave when the closure element cools toward ambient temperature; and
    wherein when the surface of the closure element is convex, the surface is proximal to a boss concentrically surrounding the inlet port with a gap between the surface and the boss such that the boss does not contact the surface, thereby restricting the backflow of water in the housing from the outlet port to the inlet port while maintaining some access for water to flow to or from the inlet port.

11. The thermally-actuated flow-restrictor device of claim 10, wherein the closure element is bimetal.

12. The thermally-actuated flow-restrictor device of claim 10, further comprising a seal located within the housing.

13. The thermally-actuated flow-restrictor device of claim 12, wherein the seal is an O-ring.

14. The thermally-actuated flow-restrictor device of claim 10, wherein the predetermined temperature is at least 120 degrees Fahrenheit.

15. The thermally-actuated flow-restrictor device of claim 10, wherein the flow- restrictor device is configured to be installed in a water inlet line of the aircraft galley insert between a water inlet fitting and a water tank of the aircraft galley insert.

16. The thermally-actuated flow-restrictor device of claim 10, wherein the flow- restrictor device is configured to be installed in one of a water inlet fitting and a water tank of the aircraft galley insert.

17. The thermally-actuated flow-restrictor device of claim 10, further comprising a fastener arrangement in the housing for fastening the first flanged fitting to the second flanged fitting.

18. A thermally-actuated flow-restrictor device for an aircraft galley insert, the flow-restrictor device comprising:
   a housing including a first flanged fitting and a second flanged fitting, the first flanged fitting including an outlet port configured to connect in fluid communication with the aircraft galley insert, and the second flanged fitting including an inlet port configured to connect in fluid communication with an aircraft potable water supply, wherein a seal is contained within the housing;
   a closure element contained within the housing, the closure element including one or more apertures for water to flow within the housing from the inlet port to the outlet port, the closure element having a surface facing the inlet port that is concave when the closure element is at ambient temperature to allow water to flow through the closure element from the inlet port to the outlet port;
   wherein the closure element is a disc that includes a plurality of metals each having a different coefficient of thermal expansion which allow the surface of the closure element facing the inlet port to become convex when water having a predetermined temperature contacts the closure element and which allows the surface of the closure element to return to being concave when the closure element cools toward ambient temperature; and
   wherein when the surface of the closure element is convex, the surface is proximal to a boss concentrically surrounding the inlet port with a gap between the surface and the boss such that the boss does not contact the surface, thereby restricting the backflow of water in the housing from the outlet port to the inlet port while maintaining some access for water to flow to or from the inlet port.

* * * * *